(12) United States Patent
Cui et al.

(10) Patent No.: US 11,499,043 B2
(45) Date of Patent: Nov. 15, 2022

(54) AQUEOUS DISPERSION OF MULTISTAGE POLYMER

(71) Applicants: Dow Global Technologies LLC, Midland, MI (US); Rohm and Haas Company, Collegeville, PA (US)

(72) Inventors: Longlan Cui, Shanghai (CN); Rui Wang, Shanghai (CN); Siyuan Jiang, Shanghai (CN); Wei Gao, Fort Washington, PA (US)

(73) Assignees: Dow Global Technologies LLC, Midland (ML); Rohm and Haas Company, Collegeville, PA (US)

( * ) Notice: Subject to any disclaimer, the term of this patent is extended or adjusted under 35 U.S.C. 154(b) by 246 days.

(21) Appl. No.: 16/761,084

(22) PCT Filed: Dec. 25, 2017

(86) PCT No.: PCT/CN2017/118187
§ 371 (c)(1),
(2) Date: May 1, 2020

(87) PCT Pub. No.: WO2019/126914
PCT Pub. Date: Jul. 4, 2019

(65) Prior Publication Data
US 2020/0354559 A1  Nov. 12, 2020

(51) Int. Cl.
| | | |
|---|---|---|
| *C08F 265/00* | (2006.01) |
| *C08F 265/02* | (2006.01) |
| *C08F 236/20* | (2006.01) |
| *C08F 220/06* | (2006.01) |
| *C08F 216/12* | (2006.01) |
| *C08F 22/02* | (2006.01) |
| *C08F 222/02* | (2006.01) |
| *C08F 2/22* | (2006.01) |
| *C08F 2/38* | (2006.01) |
| *C08L 33/08* | (2006.01) |
| *C09D 7/43* | (2018.01) |
| *C08F 220/18* | (2006.01) |
| *C08F 2/00* | (2006.01) |
| *C09D 133/08* | (2006.01) |
| *C09D 7/44* | (2018.01) |
| *C08F 220/28* | (2006.01) |
| *C08F 222/10* | (2006.01) |
| *C08K 5/19* | (2006.01) |
| *C08L 5/00* | (2006.01) |
| *C08L 29/04* | (2006.01) |
| *C08L 71/02* | (2006.01) |
| *C08L 75/08* | (2006.01) |
| *C09D 5/02* | (2006.01) |

(52) U.S. Cl.
CPC .............. *C08L 33/08* (2013.01); *C08F 2/001* (2013.01); *C08F 2/22* (2013.01); *C08F 2/38* (2013.01); *C08F 220/06* (2013.01); *C08F 220/1802* (2020.02); *C08F 220/1805* (2020.02); *C08F 220/1806* (2020.02); *C08F 220/286* (2020.02); *C08F 222/102* (2020.02); *C08F 236/20* (2013.01); *C08K 5/19* (2013.01); *C08L 5/00* (2013.01); *C08L 29/04* (2013.01); *C08L 71/02* (2013.01); *C08L 75/08* (2013.01); *C09D 5/024* (2013.01); *C09D 7/43* (2018.01); *C09D 7/44* (2018.01); *C09D 133/08* (2013.01); *C08F 2800/20* (2013.01); *C08L 2201/54* (2013.01); *C08L 2203/16* (2013.01); *C08L 2205/025* (2013.01)

(58) Field of Classification Search
CPC .. C08F 265/00; C08F 265/02; C08F 220/286; C08F 220/1806; C08F 220/1805; C08F 220/1802; C08F 222/102; C08F 2/001; C08F 2/22; C08F 2/38; C08F 220/06; C08F 236/20; C08F 2800/20; C08F 22/02; C08F 222/02; C08F 216/12; C08F 216/1425; C08F 216/1433; C08F 216/1441; C08F 216/145
USPC .......................................................... 524/523
See application file for complete search history.

(56) References Cited

U.S. PATENT DOCUMENTS

| | | |
|---|---|---|
| 2009/0143528 A1 | 6/2009 | Mestach et al. |
| 2014/0275460 A1 | 9/2014 | Tamareselvy et al. |
| 2015/0203676 A1* | 7/2015 | Li ..................... C08F 290/062 524/522 |
| 2016/0168291 A1 | 6/2016 | Fan et al. |
| 2016/0208128 A1 | 7/2016 | Kehrloesser et al. |

FOREIGN PATENT DOCUMENTS

| | | |
|---|---|---|
| CN | 1965042 | 5/2007 |
| CN | 103772625 | 5/2014 |
| CN | 103987745 | 8/2014 |

(Continued)

OTHER PUBLICATIONS

Brandrup, Polymer Handbook, 1999, 4th ed.
Fox, "Session J," Bull. Am. Physics Soc., 1956, p. 123, vol. 1, No. 3.
Supplementary European Search Report for the corresponding European Application No. 17935898, Date of completion of the search: Jun. 30, 2021; 7 pages.
Supplementary European Search Report; Application No. EP18897675; dated Aug. 9, 2021; 2 pages.

*Primary Examiner* — Kelechi C Egwim
(74) *Attorney, Agent, or Firm* — Karl E. Stauss; Cantor Colburn LLP

(57) ABSTRACT

An aqueous dispersion of a hydrophobically-modified alkali-soluble multistage polymer useful as a thickener affording high thickening efficiency and an aqueous coating composition comprising such aqueous dispersion showing good stability after heat aging without compromising stability upon addition of colorants.

12 Claims, No Drawings

(56) References Cited

FOREIGN PATENT DOCUMENTS

| | | |
|---|---|---|
| CN | 103788283 B | 1/2016 |
| CN | 105408374 | 3/2016 |
| EP | 444791 | 9/1991 |
| EP | 190892 B1 | 11/1991 |
| EP | 706535 B1 | 6/1997 |
| EP | 1431324 A2 | 6/2004 |
| EP | 2166044 A1 | 3/2010 |
| WO | 2009090204 | 7/2009 |
| WO | 2015018047 A1 | 2/2015 |
| WO | 2015073117 | 5/2015 |
| WO | 2016095197 | 6/2016 |
| WO | 2017058849 | 4/2017 |
| WO | 2017214918 A1 | 12/2017 |

\* cited by examiner

AQUEOUS DISPERSION OF MULTISTAGE POLYMER

FIELD OF THE INVENTION

The present invention relates to an aqueous dispersion of a multistage polymer and an aqueous coating composition comprising the same.

INTRODUCTION

Hydrophobically-modified alkali-soluble emulsions (HASE) are widely used to thicken aqueous compositions upon neutralization with a base. These thickeners are generally based upon incorporation of a hydrophobic associated monomer into a polymeric backbone through one-stage or multistage polymerization. Conventional multistage HASE thickeners typically comprise a hydrophobically-modified linear polymer in the first stage, and a hydrophobically-modified crosslinked polymer in the second stage. As compared to one-stage linear HASE thickeners, these conventional multistage HASE thickeners have advantages in color floatation and water dilution resistance, but aqueous coating compositions comprising these thickeners still have an issue of viscosity increase when subjected to heat aging. To improve the heat-age stability of aqueous coating compositions, EP0444791A1 discloses a polymeric thickener. The polymeric thickener can be a multistage polymer comprising at least one base-soluble polymer stage and at least one base-insoluble polymer stage, wherein the weight ratio of said base-soluble polymer to said base-insoluble polymer is about 99:1 to 1:99, and more preferably about 95:5 to 50:50. The ionically-soluble polymer is formed by polymerizing a monomer mixture of about 1.1 to about 55% by weight of at least one hydrophobic monomer. The thickening efficiency of such polymeric thickener still has room to improve.

Therefore, it is desirable to provide an aqueous dispersion of a multistage polymer which is useful as a thickener affording high thickening efficiency that provides coating compositions with improved viscosity stability when subjected to heat aging without compromising viscosity stability upon addition of colorants.

SUMMARY OF THE INVENTION

The present invention provides a novel aqueous multistage polymer dispersion and an aqueous coating composition comprising the same. The aqueous multistage polymer dispersion is useful as a thickener affording high thickening efficiency, for example, less than 10 grams of solids of such aqueous multistage polymer dispersion needed to afford the viscosity of the aqueous coating composition of 100 Krebs Units (KU). The aqueous coating composition of the present invention have improved storage stability after heat-aging (herein "heat-age stability"), for example, at 50-60° C., as indicated by a viscosity change within ±10 KU. The thickening efficiency and the heat-age stability are measured according to the test methods described in the Examples section below. The aqueous coating composition of the present invention can also have better viscosity stability upon addition of colorants than aqueous coating compositions comprising one-stage linear HASE thickeners.

In a first aspect, the present invention is an aqueous dispersion of a multistage polymer, wherein the multistage polymer comprises:

(A) a polymer A comprising, by weight based on the weight of the polymer A, (a1) 15% or more of structural units of an α, β-ethylenically unsaturated carboxylic acid, (a2) structural units of a monoethylenically unsaturated nonionic monomer, (a3) less than 0.1% of structural units of a hydrophobic associated monomer, and optionally (a4) structural units of a crosslinker selected from a $C_3$-$C_{20}$ alkylene glycol di(meth)acrylate, a poly(alkylene glycol) di(meth)acrylate, and combinations thereof; and (B) a polymer B comprising, by weight based on the weight of the polymer B, (b1) 15% or more of structural units of an α, β-ethylenically unsaturated carboxylic acid, (b2) structural units of a monoethylenically unsaturated nonionic monomer, (b3) from 0.1% to 60% by weight of structural units of a hydrophobic associated monomer, and (b4) structural units of a crosslinker selected from a $C_3$-$C_{20}$ alkylene glycol di(meth)acrylate, a poly(alkylene glycol) di(meth)acrylate, and combinations thereof;

wherein the weight ratio of the polymer A to the polymer B is from 95:5 to 55:45.

In a second aspect, the present invention is a process of preparing an aqueous dispersion of a multistage polymer by multistage free-radical polymerization. The process comprises:

(i) preparing a polymer A in an aqueous medium by free-radical polymerization of a first monomer mixture comprising, based on the total weight of the first monomer mixture, 15% by weight or more of an α, β-ethylenically unsaturated carboxylic acid, a monoethylenically unsaturated nonionic monomer, less than 0.1% by weight of a hydrophobic associated monomer, and optionally a crosslinker selected from a $C_3$-$C_{20}$ alkylene glycol di(meth)acrylate, a poly(alkylene glycol) di(meth)acrylate, or combinations thereof; and (ii) preparing a polymer B in the presence of the polymer A obtained from step (i) by a free-radical polymerization of a second monomer mixture comprising, based on the total weight of the second monomer mixture, 15% by weight or more of an α, β-ethylenically unsaturated carboxylic acid, a monoethylenically unsaturated nonionic monomer, from 0.1% to 60% by weight of a hydrophobic associated monomer, and a crosslinker selected from a $C_3$-$C_{20}$ alkylene glycol di(meth)acrylate, a poly(alkylene glycol) di(meth)acrylate, or combinations thereof;

wherein the weight ratio of the polymer A to the polymer B is from 95:5 to 55:45.

In a third aspect, the present invention is an aqueous coating composition comprising the aqueous dispersion of the first aspect.

DETAILED DESCRIPTION OF THE INVENTION

"Acrylic" in the present invention includes (meth)acrylic acid, (meth)alkyl acrylate, (meth)acrylamide, (meth)acrylonitrile and their modified forms such as (meth)hydroxyalkyl acrylate. Throughout this document, the word fragment "(meth)acryl" refers to both "methacryl" and "acryl". For example, (meth)acrylic acid refers to both methacrylic acid and acrylic acid, and methyl (meth)acrylate refers to both methyl methacrylate and methyl acrylate.

"Glass transition temperature" or "$T_g$" in the present invention can be measured by various techniques including, for example, differential scanning calorimetry ("DSC") or calculation by using a Fox equation. The particular values of $T_g$ reported herein are those calculated by using the Fox equation (T. G. Fox, Bull. Am. Physics Soc., Volume 1, Issue No. 3, page 123 (1956)). For example, for calculating the $T_g$ of a copolymer of monomers $M_1$ and $M_2$, $$\frac{1}{T_g(calc.)} = \frac{w(M_1)}{T_g(M_1)} + \frac{w(M_2)}{T_g(M_2)},$$

wherein $T_g$(calc.) is the glass transition temperature calculated for the copolymer, $w(M_1)$ is the weight fraction of monomer $M_1$ in the copolymer, $w(M_2)$ is the weight fraction of monomer $M_2$ in the copolymer, $T_g(M_2)$ is the glass transition temperature of the homopolymer of monomer $M_1$, and $T_g(M_2)$ is the glass transition temperature of the homopolymer of monomer $M_2$; all temperatures being in K. The glass transition temperatures of the homopolymers may be found, for example, in "Polymer Handbook", edited by J. Brandrup and E. H. Immergut, Interscience Publishers.

As used herein, the term structural units, also known as polymerized units, of the named monomer refers to the remnant of the monomer after polymerization, or the monomer in polymerized form. For example, a structural unit of methyl methacrylate is as illustrated:

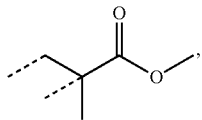

where the dotted lines represent the points of attachment of the structural unit to the polymer backbone.

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

The multistage polymer in the aqueous dispersion of the present invention comprises at least one polymer A and at least one polymer B that is different from the polymer A, which are formed in different stages of multistage free-radical polymerization.

The polymer A in the multistage polymer may comprise structural units of one or more α, β-ethylenically unsaturated carboxylic acids (a1). Examples of suitable α, β-ethylenically unsaturated carboxylic acids include an acid-bearing monomer such as acrylic acid, methacrylic acid, maleic acid, itaconic acid, crotonic acid, or fumaric acid; a monomer bearing an acid-forming group which yields or is subsequently convertible to, such an acid group (such as anhydride, (meth)acrylic anhydride, or maleic anhydride); or mixtures thereof. The polymer A may comprise, by weight based on the weight of the polymer A, 15% or more, 20% or more, 25% or more, 30% or more, 35% or more, 40% or more, or even 45% or more, and at the same time, 60% or less, 55% or less, or even 50% or less, structural units of the α, β-ethylenically unsaturated carboxylic acid. "Weight of the polymer A" in the present invention refers to dry weight or solids weight of the polymer A.

The polymer A in the multistage polymer may also comprise structural units of one or more monoethylenically unsaturated nonionic monomers (a2). As used herein, the term "nonionic monomers" refers to monomers that do not bear an ionic charge between pH=1-14. Suitable monoethylenically unsaturated nonionic monomers may include, for example, alkyl esters of (meth)acrylic acids, vinyl aromatic monomers such as styrene and substituted styrenes, vinyl esters of carboxylic acids, ethylenically unsaturated nitriles, or mixtures thereof. Preferably, the monoethylenically unsaturated nonionic monomer is a $C_1$-$C_{18}$, $C_2$-$C_{10}$, or $C_3$-$C_6$ alkyl esters of (meth)acrylic acid, for example, methyl acrylate, methyl methacrylate, ethyl acrylate, butyl acrylate, butyl methacrylate, 2-ethylhexyl acrylate, iso-butyl (meth)acrylate, hexyl (meth)acrylate, lauryl (meth)acrylate, stearyl (meth)acrylate, cyclohexyl (meth)acrylate, benzyl(meth)acrylate, oleyl(meth)acrylate, palmityl (meth)acrylate, nonyl (meth)acrylate, decyl (meth)acrylate, dodecyl (meth)acrylate, pentadecyl (meth) acrylate, hexadecyl (meth)acrylate, octadecyl (meth)acrylate. More preferably, the monoethylenically unsaturated nonionic monomers are selected from the group consisting of methyl methacrylate, ethyl acrylate, butyl acrylate, and 2-ethylhexyl acrylate. The polymer A may comprise, by weight based on the weight of the polymer A, from 40% to 85%, from 45% to 80%, or from 50% to 70%, of structural units of the monoethylenically unsaturated nonionic monomers.

The polymer A in the multistage polymer may optionally comprise, by weight based on the weight of the polymer A, less than 0.1% of structural units of one or more hydrophobic associated monomers (a3). The hydrophobic associated monomers may have the structure of formula I:

wherein R is H or $CH_3$, $R^1$ is a $C_1$-$C_2$ alkyl group, $R^2$ is an aralkyl phenyl group or a $C_8$-$C_{50}$ linear or branched alkyl group, n is an integer of from 6 to 100, from 10 to 60, or from 20 to 40, and m is an integer of from 0 to 50, provided that n≥m and m+n is from 6 to 100. m can be an integer of from 0 to 20, from 0 to 10, or from 0 to 5. Preferably, m is 0 and n is an integer from 10 to 60; and more preferably, m is 0 and n is an integer from 20 to 40. Preferred R is $CH_3$. $R^2$ may be an alkyl benzene substituted benzene group, preferably a $C_1$-$C_4$ alkyl benzene substituted benzene group, and more preferably an ethyl benzene substituted benzene group. Suitable hydrophobic associated monomers may include, for example, polyethoxy lauryl methacrylate (23 oxyethylene (EO) units), polyethoxy C13/C15 methacrylate (20EO), polyethoxy cetostearyl methacrylate (30EO), ceteth-20 methacrylate, behenyl polyethoxy methacrylate (30EO), polyethoxylated tristyryl phenol methacrylate (25EO), polyethoxy stearyl methacrylate (20EO), polyethoxy cetyl methacrylate (25EO), polyethoxy lauryl methacrylate (10EO), polyethoxy stearyl methacrylate (25EO), polyoxyethylene behenyl-tricosyl methacrylate, methacrylate ester of 20 mole ethoxylate of cetyl-stearyl alcohol, or mixtures thereof. The polymer A may comprise, by weight based on the weight of the polymer A, less than 0.1%, less than 0.09%, less than 0.08%, less than 0.07%, less than 0.06%, less than 0.05%, less than 0.04%, less than 0.03%, less than 0.02%, less than 0.01%, or even zero, of structural units of the hydrophobic associated monomer. In some embodiments, the polymer A is substantially free of structural units of the hydrophobic associated monomer, e.g., less than 0.02%, less than 0.01%, or even zero, based on the weight of the polymer A.

The polymer A in the multistage polymer may optionally comprise structural units of one or more crosslinkers selected from $C_3$-$C_{20}$ alkylene glycol di(meth)acrylates, poly(alkylene glycol) di(meth)acrylates, or combinations thereof. Preferably, the alkylene glycol di(meth)acrylate is a $C_3$-$C_{15}$ alkylene glycol di(meth)acrylate, and more preferably a $C_3$-$C_{10}$ alkylene glycol di(meth)acrylate. The poly(alkylene glycol) di(meth)acrylate useful in the present invention may include poly(ethylene glycol) di(meth)acrylate, poly(propylene glycol) di(meth)acrylate, poly(butylene glycol) di(meth)acrylate, or combinations thereof. The poly(alkylene glycol) di(meth)acrylate may comprise from 2 to 20, from 2 to 10, or from 2 to 8 alkylene oxide units. Examples of suitable crosslinkers include 1,3-butylene glycol dimethacrylate, 1,4-butanediol dimethacrylate, glycerol 1,3-dimethacrylate, diethylene glycol dimethacrylate, triethylene glycol dimethacrylate, tripropylene glycol dimethacrylate, 1,6-hexanediol di(meth)acrylate, neopentyl glycol di(meth)acrylate, 1,9-nonanediol di(meth)acrylate, propylene glycol diacrylate, 1,1,1-trimethylolpropane dimethacrylate, 1,1,1-trimethylolethane diacrylate, or mixtures thereof. The polymer A may comprise, by weight based on the weight of the polymer A, from 0 to 2%, from 0.01% to 1%, from 0.02% to 0.5%, or from 0.03% to 0.25%, of structural units of the crosslinker.

In some embodiments, the polymer A comprises, by weight based on the weight of the polymer A, (a1) from 20% to 60% of structural units of the α, β-ethylenically unsaturated carboxylic acid, (a2) from 40% to 80% of structural units of the monoethylenically unsaturated nonionic monomer, (a3) from 0 to 0.05% of structural units of the hydrophobic associated monomer, and (a4) from 0 to 0.25% of structural units of the crosslinker.

In some preferred embodiments, the polymer A consists of structural units of the α, β-ethylenically unsaturated carboxylic acid, the monoethylenically unsaturated nonionic monomer, and optionally the crosslinker.

The polymer A in the multistage polymer may have a $T_g$ of from 5 to 80° C., from 10 to 70° C., or from 15 to 60° C.

The multistage polymer useful in the present invention further comprises the polymer B that is different from the polymer A. The polymer B may comprise structural units of one or more α, β-ethylenically unsaturated carboxylic acid (b1), which can be selected from the same group (a1) as described above in the polymer A section. The polymer B may comprise, by weight based on the weight of the polymer B, 15% or more, 20% or more, 25% or more, 30% or more, 35% or more, 40% or more, or even 45% or more, and at the same time, 60% or less, 55% or less, or even 50% or less, structural units of the α, β-ethylenically unsaturated carboxylic acids. "Weight of the polymer B" in the present invention refers to dry weight or solids weight of the polymer B.

The polymer B in the multistage polymer may also comprise structural units of one or more monoethylenically unsaturated nonionic monomers (b2), which can be selected from the same group (a2) as described above in the polymer A section. The polymer B may comprise, by weight based on the weight of the polymer B, 5% or more, 10% or more, 20% or more, 25% or more, 30% or more, 35% or more, or even 40% or more, and at the same time, 84% or less, 80% or less, 75% or less, 70% or less, or even 65% or less, of structural units of the monoethylenically unsaturated nonionic monomers.

The polymer B in the multistage polymer may further comprise structural units of one or more hydrophobic associated monomers (b3), which can be selected from the same group (a3) as described above in the polymer A section. The polymer B may comprise, by weight based on the weight of the polymer B, 0.1% or more, 0.5% or more, 1% or more, 1.5% or more, 2% or more, 3% or more, 4% or more, or even 5% or more, and at the same time, 60% or less, 50% or less, 40% or less, 30% or less, 20% or less, 15% or less, 10% or less, or even 8% or less, of structural units of the hydrophobic associated monomer.

The polymer B in the multistage polymer may comprise structural units of one or more crosslinkers (b4), which can be selected from the same group (a4) as described above in the polymer A section. The polymer B may comprise, by weight based on the weight of the polymer B, from 0.01% to 20%, from 0.02% to 15%, from 0.03% to 10%, from 0.05% to 5%, or from 0.1% to 2%, of structural units of the crosslinker.

In some embodiments, the polymer B comprises, by weight based on the weight of the polymer B, (b1) from 20% to 60% of structural units of the α, β-ethylenically unsaturated carboxylic acid, (b2) from 35% to 75% of structural units of the monoethylenically unsaturated nonionic monomer, (b3) from 0.1% to 30% of structural units of the hydrophobic associated monomer, and (b4) from 0.01% to 2% of structural units of the crosslinker.

The polymer B may have a $T_g$ of from 5 to 120° C., from 10 to 100° C., or from 15 to 80° C.

The weight ratio of the polymer A to the polymer B may be in the range of from 95:5 to 55:45, from 94:6 to 56:44, from 92:8 to 58:42, from 91:9 to 59:41, from 90:10 to 60:40, from 85:15 to 65:35, or from 80:20 to 70:30.

The multistage polymer useful in the present invention may further comprise structural units of one or more monoethylenically unsaturated monomers carrying at least one functional group selected from a carbonyl, sulfonate, phosphate, hydroxyl, amide, or ureido group, in polymer A, in the polymer B, or in both polymer A and polymer B. Suitable monoethylenically unsaturated monomers carrying at least one functional group may include, for example, diacetone (meth)acrylamide (DAAM), acetoacetoxyethyl methacrylate (AAEM), acrylamide, methacrylamide, sodium styrene sulfonate (SSS), sodium vinyl sulfonate (SVS), 2-phosphoethyl (meth)acrylate, 2-hydroxyethyl acrylate, or mixtures thereof. The multistage polymer may comprise from 0 to 20%, from 1% to 10%, or from 2% to 5%, of structural units of the functional-group-containing monoethylenically unsaturated monomers, by weight based on the weight of the multistage polymer, e.g., total weight of the polymer A and the polymer B.

In some preferred embodiments, the multistage polymer in the aqueous dispersion of the present invention comprises:

(A) the polymer A comprising, by weight based on the weight of the polymer A, (a1) from 20% to 60% of structural units of the α, β-ethylenically unsaturated carboxylic acid, (a2) from 40% to 80% of structural units of the (meth)acrylic acid alkyl ester, (a3) less than 0.05% of structural units of the hydrophobic associated monomer, and optionally (a4) from 0 to 0.25% of structural units of the crosslinker; and (B) the polymer B comprising, by weight based on the weight of the polymer B, (b1) from 20% to 60% of structural units of the α, β-ethylenically unsaturated carboxylic acid, (b2) from 40% to 80% of structural units of the (meth)acrylic acid alkyl ester, (b3) from 1% to 10% of structural units of the hydrophobic associated monomer, and (b4) from 0.01% to 2% by weight of structural units of the crosslinker;

wherein the weight ratio of the polymer A to the polymer B is from 90:10 to 60:40.

The multistage polymer useful in the present invention may have a weight average molecular weight of 30,000 daltons or more, 200,000 daltons or more, 600,000 daltons or more, 700,000 daltons or more, 800,000 daltons or more, 900,000 daltons or more, or even 1,000,000 daltons or more, and at the same time, 10,000,000 daltons or less, 9,200,000 daltons or less, 9,100,000 daltons or less, 9,000,000 daltons or less, 8,000,000 daltons or less, 7,000,000 daltons or less, 6,000,000 daltons or less, 5,000,000 daltons or less, 4,000,000 daltons or less, 3,500,000 daltons or less, or even 3,000,000 daltons or less. The molecular weight herein may be characterized using Asymmetric Flow Field Flow Fractionation with on-line Multi Angle Light Scattering (MALS) and differential Refractive Index detectors, according to the test method described in the Examples section below.

The types and levels of the monomers described above may be chosen to provide the multistage polymer with a $T_g$ suitable for different applications. The $T_g$ of the multistage polymer may be in the range of from 5 to 100° C., from 10 to 80° C., or from 15 to 60° C. The multistage polymer particles may have a number average particle size particle size of from 70 nanometers (nm) to 300 nm, from 80 nm to 200 nm, from 90 nm to 150 nm, or from 100 nm to 120 nm as measured by Brookhaven BI-90 Particle Size Analyzer.

The aqueous dispersion of the multistage polymer of the present invention further comprises water. The concentration of water may be, based on the total weight of the aqueous dispersion, from 30% to 90% by weight or from 40% to 80% by weight. The aqueous dispersion of the multistage polymer is useful in many applications including, for example, wood coatings, architecture coatings, and traffic paints. The aqueous dispersion of the multistage polymer is useful for thickening aqueous coating compositions and can demonstrate satisfactory thickening efficiency. "Satisfactory thickening efficiency" herein refers to the dry dosage of a thickener in an aqueous coating composition less than 10 grams (g), preferably less than 5 g, in 1 kilogram (kg) of the aqueous coating composition to afford a viscosity of 100 KU, as measured according to the test method described in the Examples section below.

The present invention also relates to a process of preparing the aqueous dispersion of the multistage polymer of the present invention. Such process may include a multistage free-radical polymerization in which at least two stages are formed sequentially, which usually results in the formation of the multistage polymer comprising at least two polymer compositions such as the polymer A in the first stage and the polymer B in the second stage. In preparing the multistage polymer particles, the polymer A can be polymerized first and subsequently the second polymer is polymerized in the presence of the polymer A. Each stage of the multistage free-radical polymerization can be conducted by polymerization techniques well known in the art such as suspension polymerization or emulsion polymerization of the monomers described above. Emulsion polymerization is a preferred process. The polymer A can be polymerized from a first monomer mixture comprising the α, β-ethylenically unsaturated carboxylic acid (a1), the monoethylenically unsaturated nonionic monomer (a2), and optionally, the hydrophobic associated monomer (a3) and/or the multiethylenically unsaturated crosslinker (a4). Then, the polymer B may be polymerized from a second monomer mixture comprising the α, β-ethylenically unsaturated carboxylic acid (b1), the monoethylenically unsaturated nonionic monomer (b2), the hydrophobic associated monomer (b3), and the crosslinker (b4). The dosage of each monomer, based on the weight of the first monomer mixture, in the first monomer mixture for preparing the polymer A may be substantially the same as the content of the structural units of such monomer in the polymer A as described above. The same applies to the dosage of each monomer in the second monomer mixture for preparing the polymer B. Total weight concentration of monomers for preparing the polymer A and the polymer B, respectively, is equal to 100%. The first monomer mixture and/or the second monomer mixture may be added as an emulsion in water; or added in one or more additions or continuously, linearly or nonlinearly, over the reaction period of preparing the polymer A or the polymer B, or combinations thereof. Temperature suitable for emulsion polymerization processes may be lower than 100° C., for example, in the range of from 30° C. to 95° C., or in the range of from 50° C. to 90° C.

In the multistage free-radical polymerization process, free radical initiators may be used in the stage of preparing the polymer A, in the stage of preparing the polymer B, or in both stages. The multistage free-radical polymerization process may be thermally initiated or redox initiated emulsion polymerization in each stage. Examples of suitable free radical initiators include hydrogen peroxide, t-butyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of 0.01 to 3.0% by weight, based on the total weight of monomers. Redox systems comprising the above described initiators coupled with a suitable reductant may be used in the multistage free-radical polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, formadinesulfinic acid, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the multistage free-radical polymerization process, a surfactant may be used in the stage of preparing the polymer A, in the stage of preparing the polymer B, or in both stages. The surfactant may be added prior to or during the polymerization of the monomers, or combinations thereof. A portion of the surfactant can also be added after the polymerization. Surfactants may be used for both stages. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; ethylenically unsaturated surfactant monomers; and ethoxylated alcohols or phenols. In some preferred embodiments, the alkali metal or ammonium salts of alkyl, aryl, or alkylaryl sulfates surfactant are used. The combined amount of the surfactants used is usually from 0.1% to 10% by weight or from 1% to 5% by weight, based on the weight of total monomers used for preparing the multistage polymer.

In the multistage free-radical polymerization process, a train transfer agent may be used in the stage of preparing the polymer A, in the stage of preparing the polymer B, or in both stages. Examples of suitable chain transfer agents include 3-mercaptopropionic acid, dodecyl mercaptan, methyl 3-mercaptopropionate, butyl 3-mercaptopropionate, benzenethiol, azelaic alkyl mercaptan, or mixtures thereof. The chain transfer agent may be used in an effective amount to control the molecular weight of the multistage polymer. The chain transfer agent may be present in an amount of from 0 to 3%, from 0.01% to 2%, or from 0.05% to 1%, by weight based on the total weight of monomers used for preparing the multistage polymer.

The obtained aqueous dispersion of the multistage polymer may have a pH value of from 0.5 to 5.0, from 1.0 to 4.5, or from 1.5 to 4.0. The aqueous multistage polymer dispersion may have a viscosity of from 1 to 200 centipoises (cps), from 3 to 100 cps, or from 5 to 50 cps as measured by a Brookfield viscometer at a shear rate of 60 rpm with spindle #2 at room temperature (20-30° C.). The multistage polymer may become water soluble upon neutralization. The polymer A, the polymer B, and the resultant multistage polymer can be alkali-soluble. "Alkali-soluble" means that a polymer is substantially soluble in an aqueous medium which has been adjusted with alkali to a pH of about 5.0 or greater at room temperature. Neutralization can be conducted by adding one or more bases into the aqueous dispersion. Examples of suitable bases include ammonia; alkali metal or alkaline earth metal compounds such as sodium hydroxide, potassium hydroxide, calcium hydroxide, sodium carbonate; primary, secondary, and tertiary amines, such as triethyl amine, ethylamine, propylamine, monoisopropylamine, monobutylamine, hexylamine, ethanolamine, diethyl amine, dimethyl amine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1,12-diamine, polyethyleneimine or polyvinylamine; aluminum hydroxide; or mixtures thereof.

The present invention also relates to an aqueous coating composition, e.g., a paint formulation, comprising the aqueous multistage polymer dispersion described above typically used as a thickener. When used in the aqueous coating composition, the aqueous multistage polymer dispersion is typically neutralized to a high pH value, for example, 8 or higher, or even 8.5 or higher. The aqueous coating composition may comprise, by dry weight based on the total dry weight of the aqueous coating composition, from 0.1% to 5%, from 0.2% to 2%, or from 0.5% to 1%, of the aqueous multistage polymer dispersion.

The aqueous coating composition of the present invention may further comprise one or more binders that are different from the multistage polymer described above. The binder typically comprises, based on the weight of the binder, 10% or less, 5% or less, 2% or less of structural units of one or more α, β-ethylenically unsaturated carboxylic acids. The α, β-ethylenically unsaturated carboxylic acid constituting structural units of the binder, i.e., used in synthesis of the binder, can be selected from the same group as described above in the polymer A section. The binder can be an acrylic emulsion polymer (for example, pure acrylic emulsion polymer, styrene acrylic emulsion polymer, or mixtures thereof), vinyl acetate-ethylene emulsion polymer, vinyl acetate emulsion polymer, or mixtures thereof. In one embodiment, the binder used is an acrylic emulsion polymer. "Acrylic emulsion polymer" herein refers to an emulsion polymer comprising structural units of one or more acrylic monomers or their mixtures with other monomers including, for example, styrene or substituted styrene. The binders may have a weight average molecular weight of 50,000 daltons or more, for example, from 50,000 to 1,000,000 daltons, or from 100,000 to 200,000 daltons, as measured by gel permeation chromatography (GPC) analysis (Columns: PLgel Guard Column (10 μm, 50 mm×7.5 mm) and PLgel MIXED GEL B (10 μm); column temperature: 40° C.; mobile phase: THF/FA (5%); flow rate: 1.0 mL/minute; injection volume: 100 mL; detector: Agilent Refractive Index detector, 40° C.; and calibration curve: PL Polystyrene Narrow standards with molecular weights ranging from 2,329,000 to 580 g/mol, using polynom 3 fitness). The aqueous coating composition of the present invention may comprise, by dry weight based on the total dry weight of the aqueous coating composition, from 3% to 75%, from 10% to 60%, or from 20% to 50%, of the binder.

The aqueous coating composition of the present invention may further comprise pigments to form pigmented coating compositions (also known as "paint formulations"). "Pigment" herein refers to a particulate inorganic material which is capable of materially contributing to the opacity or hiding capability of a coating. Such materials typically have a refractive index greater than 1.8. Inorganic pigments may include, for example, titanium dioxide ($TiO_2$), zinc oxide, iron oxide, zinc sulfide, barium sulfate, barium carbonate, or mixture thereof. In a preferred embodiment, pigment used in the present invention is $TiO_2$. $TiO_2$ typically exists in two crystal forms, anastase and rutile. $TiO_2$ may be also available in concentrated dispersion form. The aqueous coating composition may also comprise one or more extenders. "Extender" herein refers to a particulate inorganic material having a refractive index of less than or equal to 1.8 and greater than 1.3. Examples of suitable extenders include calcium carbonate, clay, calcium sulfate, aluminosilicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E available from The Dow Chemical Company (ROPAQUE is a trademark of The Dow Chemical Company), or mixtures thereof. The aqueous coating composition may have a pigment volume concentration (PVC) of from 10% to 98%, from 15% to 90%, or from 20% to 80%. PVC may be determined according to the following equation:

$$PVC\% = [Volume_{(Pigment+Extender)} / Volume_{(Pigment+Extender+Binder)}] \times 100\%.$$

The aqueous coating composition of the present invention may also comprise one or more dispersants. The dispersants may include non-ionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids, including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The molecular weight of such polyacids may be in the range of from 1,000 to 20,000 daltons, from 1,200 to 10,000 daltons, or from 1,500 to 8,000 daltons as measured by GPC analysis (column: One PLgel GUARD columns (10 μm, 50×7.5 mm) and One Mixed B columns (7.8×300 mm) in tandem; and calibration: PL Polystyrene Narrow standards with molecular weights ranging from 2329000 to 580 g/mol, using polynom 3). Suitable commercially available dispersants may include those under the tradename OROTAN™ from The Dow Chemical Company, such as OROTAN 731 A, OROTAN 1288; OROTAN 1124; OROTAN 165, OROTAN 2001, OROTAN CA-2500, and OROTAN 681 dispersants. The dispersants may be used in pigment grinding stage or letdown stage of making coating compositions. The dispersants may be present, based on the total weight of the aqueous coating composition, in an amount of from 0 to 5% by weight, from 0.2% to 3% by weight, or from 0.3% to 2% by weight.

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates, or mixtures thereof. Suitable commercially available defoamers include, for example, TEGO Airex 902 W and TEGO Foamex 1488 polyether siloxane copolymer emulsions both available from TEGO, BYK-024 silicone deformer available from BYK, or mixtures thereof. The concentration of the defoamer may be, by weight based on the total dry weight of the aqueous coating composition, generally from 0 to 1%, from 0.05% to 0.8%, or from 0.1% to 0.5%.

The aqueous coating composition of the present invention may further comprise one or more additional thickeners that are different from the aqueous multistage polymer dispersion of the present invention. The additional thickeners may include cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose, and other additional thickeners, e.g., polyvinyl alcohol (PVA), clay materials, urethane associate thickeners (UAT), polyether urea polyurethanes (PEUPU), polyether polyurethanes (PEPU), hydrophobically modified ethoxylated urethanes (HEUR), or mixtures thereof. The additional thickener may be present, by weight based on the total dry weight of the aqueous coating composition, generally in an amount of from 0 to 5%, from 0.1% to 3%, or from 0.2% to 1%.

The aqueous coating composition of the present invention may further comprise one or more wetting agents. "Wetting agents" herein refer to chemical additives that reduce the surface tension of a coating composition, causing the coating composition to more easily spread across or penetrate the surface of a substrate. Wetting agents may be polycarboxylates, anionic, zwitterionic, or non-ionic. The wetting agent may be present, by weight based on the total dry weight of the aqueous coating composition, in an amount of from 0 to 2.5%, from 0.5% to 2%, or from 1% to 1.5%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. The coalescent may be present, by weight based on the total dry weight of the aqueous coating composition, from 0 to 5%, in an amount of from 1% to 4%, or from 2% to 3%.

In addition to the components described above, the aqueous coating composition of the present invention may further comprise any one or combination of the following additives: buffers, neutralizers, freeze/thaw additives, humectants, mildewcides, biocides, anti-skinning agents, colorants, flowing agents, anti-oxidants, plasticizers, leveling agents, thixotropic agents, adhesion promoters, and grind vehicles. These additives may be present in a combined amount of from 0 to 5%, from 1% to 4%, or from 2% to 3%, by weight based on the total weight of the aqueous coating composition.

The aqueous coating composition of the present invention may be prepared by admixing the aqueous multistage polymer dispersion, the binder and other optional components, e.g., pigments and/or extenders as described above. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises pigment and/or extender, that is, a pigment formulation, the pigments and/or extenders are preferably mixed with the dispersant to form a slurry of pigments and/or extender.

The aqueous coating composition of the present invention has good heat-age stability. "Good heat-age stability" herein refers to a viscosity change within ±10 KU units after heat aging the aqueous coating composition at 50° C. for 7 days or more, 14 days or more, 21 days or more, 28 days or more, or even 35 days or more, as measured according to the test method described in the Examples section below. The aqueous coating composition may also have better viscosity stability upon addition of colorants as compared to aqueous coating compositions comprising one-stage linear HASE thickeners.

The present invention also relates to a process of using the aqueous coating composition, comprising the following: applying the aqueous coating composition to a substrate, and drying, or allowing to dry, the applied aqueous coating composition.

The present invention also provides a method of preparing a coating. The method may comprise: forming the aqueous coating composition of the present invention, applying the aqueous coating composition to a substrate, and drying, or allowing to dry, the applied aqueous coating composition to form the coating.

The aqueous coating composition of the present invention can be applied to, and adhered to, various substrates. Examples of suitable substrates include wood, metals, plastics, foams, stones, elastomeric substrates, glass, fabrics, concrete, or cementitious substrates. The coating composition, preferably comprising the pigment, is suitable for various applications such as marine and protective coatings, automotive coatings, traffic paint, Exterior Insulation and Finish Systems (EIFS), roof mastic, wood coatings, coil coatings, plastic coatings, powder coatings, can coatings, architectural coatings, and civil engineering coatings. The coating composition is particularly suitable for architectural coatings. The aqueous coating composition can be used alone, or in combination with other coatings to form multi-layer coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the coating composition of the present invention has been applied to a substrate, the coating composition can dry, or allow to dry, to form a film (this is, coating) at room temperature (20-25° C.), or at an elevated temperature, for example, from 35° C. to 60° C.

EXAMPLES

Some embodiments of the invention will now be described in the following Examples, wherein all parts and percentages are by weight unless otherwise specified. The following materials are used in the examples:

Glacial methacrylic acid (GMAA), ethyl acrylate (EA), ammonium persulfate (APS) used as an initiator, tert-butyl hydroperoxide (t-BHP) used as an oxidant, isoascorbic acid (IAA) used as a reductant, and n-dodecyl mercaptan (nDDM) used as a chain transfer agent, are all available from The Dow Chemical Company.

SIPOMER BEM Polyoxyethylene behenyl-tricosyl methacrylate (BEM) and SIPOMER SEM-25 Polyethoxylated tristyryl phenol methacrylate (SEM) are both available from Solvay Company.

Polyethoxy cetyl-stearyl methacrylate with 20 EO (PCSM) is available from Kal-Gard.

Ferrous sulfate ($FeSO_4 \cdot 7H_2O$) used as a promoter and sodium acetate used as a buffer are all from Sinopharm Chemical Reagent Co., Ltd.

Allyl methacrylate (ALMA) and Diallyl phthalate (DAP), both available from The Dow Chemical Company, are used as crosslinkers.

Ethylene glycol dimethacrylate (EGDMA), 1,3-Butanediol dimethacrylate (BGDMA), 1,4-butanediol dimethacrylate (BDDMA), glycerol 1,3-dimethacrylate (GDMA), diethylene glycol dimethacrylate (DEGDMA), and tri(ethylene glycol) dimethacrylate (RTGDMA), all available from Solvay Company, are used as crosslinkers.

Propylene glycol used as a freeze/thaw additive, AMP-95™ 2-methyl-2-amino-propanol, OROTAN 1288 Dispersant, PRIMAL AS-356 Binder, ROPAQUE Ultra E polymer, CELLOSIZE™ QP 30000H thickener, ECOSURF™ BD-109 wetting agent, and TRITON™ CF-10 surfactant are all available from The Dow Chemical Company (AMP-95, PRIMAL, CELLOSIZE, ECOSURF, and TRITON are trademarks of The Dow Chemical Company).

Kathon LXE Defoamer is available from Nopco.

Ti-Pure R-902 ($TiO_2$) pigment is available from DuPont.

DISPONIL Fes-32 ("Fes-32") surfactant, Foamaster NXZ defoamer, and ASP-170 washed clay ("ASP-170") are all available from BASF Global Corporation.

CC-700 Extender is available from Guangfu Building Materials Group (China).

DB-80 Extender is available from Shanxi Jinyang Calcined Kaolin Ltd. (China).

Texanol, available from Eastman Chemical Company, is used as a coalescent.

SR-237 $TiO_2$ ("SR-237") is available from Shandong Dongjia Company.

BATF 998A styrene-acrylic binder is available for BATF Company.

The following standard analytical equipment and methods are used in the Examples.

Heat-Age Stability Test

A paint formulation (200 g) was put into a plastic bottle, and then an initial viscosity (Krebs Units (KU) as units) of the paint formulation was recorded at room temperature. The paint formulation was then stored in an oven at 50° C. for 7 days, 14 days, 21 days, 28 days, or 35 days, respectively. The viscosity of the paint formulation after storage was tested and recorded as heat-aged viscosity. The difference between the initial viscosity and the heat-aged viscosity is defined as the heat-age viscosity change (i.e., $\Delta$KU after heat aging). A heat-age viscosity change within ±10 KU indicates acceptable heat-age stability. The smaller heat-age viscosity change, the better heat-age stability.

Viscosity Stability after Addition of Colorant 4 g of phthalo blue colorants were added to 200 g of a paint formulation and mixed well (for example, using a paint shaker for 5 minutes) to get a uniform tinted paint. The viscosity stability after addition of colorants was determined by viscosity change before adding colorants and after adding colorants (i.e., $\Delta$KU upon addition of colorants). The smaller the viscosity change, the better viscosity stability after addition of colorants.

Thickening Efficiency

Each paint formulation was thickened to target a viscosity of 100 KU. Thickening efficiency was determined as the solids of a thickener in gram per 1000 gram of the paint that would have been required to reach the target KU about 100, and recorded in Tables 3 and 4.

When evaluating the heat-age stability, the viscosity stability after addition of colorants and the thickening efficiency, the viscosity of paint formulations was measured by a Stormer viscometer at a medium shear rate (80~100 rpm) according to the ASTM (American Society for Testing and Materials) D562-10(2014) method.

Molecular Weight of Multistage Polymers Measurement

The phrase "molecular weight" refers to the weight average molecular weight as measured using asymmetric flow field flow fractionation (AF4) with inline Multi-Angle Light Scattering (MALS) and differential Refractive Index detections. The AF4 instrument used consisted of an Eclipse™ DualTec™ separation system (from Wyatt Technology Corp.) that was coupled in series to an 18 angle multi angle light scattering (MALS) detector (DAWN HELOS II; from Wyatt Technology Corp.) and a differential refractometer (Optilab rEX; from Wyatt Technology Corp.). Flows through the AF4 instrument were provided using an Agilent Technologies 1200 series isocratic pump equipped with a micro-vacuum degasser. All injections were performed with an auto sampler (Agilent Technologies 1200 series). Data from the AF4 instrument were collected and processed using Astra software version 7.0.1.23 (from Wyatt Technology Corp.). Samples were prepared at a concentration of 1 mg/mL in 20 mM ammonium acetate solution at pH 10 (filtered with a 1.2 μm pore nylon membrane). Samples (25 μL) were injected into the standard separation channel system (25 cm long and a width dimension starting at 2.15 cm and reducing to 0.3 cm over the length) with a channel thickness of 350 μm and equipped with a 10 kDa cutoff regenerated cellulose ultrafiltration membrane (Wyatt Technology). The mobile phase used for AF4 analysis was 20 mM ammonium acetate solution at pH 10. Separation was performed with an applied channel flow of 1 mL/min. The sample was introduced to the channel with focus flow at 1.7 mL/min for 3 minutes. The elution flow started at 0.5 mL/min for 3 minutes and then followed by a linearly decreasing cross flow gradient (from 0.5 mL/min to 0.05 mL/min over 12 minutes), then held at 0.05 mL/min for another 5 minutes. The average molecular weight was calculated using Astra software version 7.0.1.23 after subtracting a blank injection with a refractive index increment (dn/dc) of 0.185 mL/g for all calculation with Berry model $2^{nd}$ order fit using the detectors at Refractive Index Corrected Scattering Angle ranged from 13.0° to 70.1°. Molecular weights are reported herein in units of daltons.

Example (Ex) 1 Synthesis of HASE IS-1

To prepare the HASE IS-1 of Ex 1, two monomer emulsions (ME1 and ME2) were prepared. ME1 was prepared by mixing deionized (DI) water (289.5 g), 32% Fes-32 (11.1 g), ethyl acrylate (263.11 g) and glacial methacrylic acid (175.4 g). ME2 was prepared by mixing DI water (124.06 g), 32% Fes-32 (4.75 g), ethyl acrylate (100.44 g), glacial methacrylic acid (71.74 g), PCSM (17.94 g) and BGDMA (0.19 g). In a 1 gallon reactor with a mechanical stirrer, a condenser, a thermometer and a nitrogen purging line, DI water (540 g) and 32% Fes-32 (17.9 g) were added. When the reactor temperature was increased up to 86° C., an initiator solution of APS (0.7 g) dissolved in DI water (8 g) was added into reactor. After 2 minutes, ME1 and 0.7% APS solution (28 g) were gradually added into the reactor over 77 minutes at 86° C. After completion of the ME1 and the initiator feed for ME1, the ME2 and 0.7% APS solution (12 g) were added into the reactor. After all the ME2 and the initiator feed for ME2 were finished, the reactor was held at 86° C. for 15 minutes and then 0.2% $FeSO_4.7H_2O$ solution (13.53 g) was added followed by 4% IAA solution (15 g) and 2% t-BHP solution (15 g) twice. Finally, the reactor was cooled down and the resultant emulsion was filtered to get the HASE IS-1 with 30% solids. The obtained IS-1 thickener had a weight average molecular weight of 3,000,000 daltons.

Exs 2-11 Synthesis of HASE IS-2 to IS-11

The HASE IS-2 to IS-11 of Exs 2-11 were prepared based on the same procedure as described in Ex 1, except that the monomer compositions for M1 and M2, and/or the weight ratio of total monomers of M1 in the first stage to total monomers of M2 in the second stage were different and are given in Table 1.

Comparative (Comp) Exs 1-9 Synthesis of HASE CS-1 to CS-7, CS-9 and CS-10

The HASE of Comp Exs 1-7 and 9-10 were prepared based on the same procedure as described in Ex 1, except that the monomer compositions for M1 and M2, and/or the weight ratio of M1 in the first stage to M2 in the second stage were different and are given in Table 1. The average weight molecular weight of multistage polymers were 20,000,000 daltons for HASE CS-5, 9,200,000 daltons for HASE CS-9, and 22,000,000 daltons for HASE CS-10.

Comp Ex 8 Synthesis of HASE CS-8

To prepare the thickener of Comp Ex 8, a monomer emulsions (ME) was prepared by mixing DI water (883 g), 32% Fes-32 (31.55 g), ethyl acrylate (572.55 g) and GMAA (567.33 g), PCSM (87.01 g) and nDDM (1.04 g). In a 1 gallon reactor with a mechanical stirrer, a condenser, a thermometer and a nitrogen purging line, DI water (707.26 g) and 32% Fes-32 (31.55 g) were added. When the reactor temperature was increased up to 86° C., an initiator solution of APS (1.28 g) dissolved in DI water (25.31 g) was added into the reactor. After 2 minutes, ME and 0.5% APS solution (113 g) were gradually added into the reactor over 85 minutes at 86° C. After completion of ME feed, the remainder of the APS solution continued feeding for 5 minutes over-feed. After all ME and initiator solution feed finished, the reactor was held at 86° C. for 15 minutes and then 0.2% $FeSO_4.7H_2O$ solution (17.72 g) was added followed by 3.5% IAA solution (23.32 g) and 8.8% t-BHP solution (18.5 g) twice. Finally, the reactor was cooled down and the resultant emulsion was filtered to get the emulsion of HASE CS-8 with 30% solids.

The above obtained thickeners were used in preparing paint formulations and the type and dosage of thickeners used for each paint formulation are given in Table 3.

TABLE 1

Thickener Composition

Composition and two-stage emulsion polymerization

| Thickener | M1 (First stage), % by weight based on the weight of total monomers in M1 | M2 (Second stage), % by weight based on the weight of total monomers in M2 | Weight ratio M1/M2 |
|---|---|---|---|
| IS-1 | 60EA/40GMAA | 53.32EA/40GMAA/6.67PCSM/0.1BGDMA | 70/30 |
| IS-2 | 55EA/45GMAA | 48.23EA/45GMAA/6.67PCSM/0.1BGDMA | |
| IS-3 | 60EA/40GMAA | 53.32EA/40GMAA/6.67BEM/0.1BGDMA | |
| IS-4 | 60EA/40GMAA | 53.32EA/40GMAA/6.67BEM/0.1RTGDMA | |
| IS-5 | 60EA/40GMAA | 53.32EA/40GMAA/6.67SEM/0.1BGDMA | |
| IS-6 | 59.92EA/40GMAA/0.08 BGDMA | 53.32EA/40GMAA/6.67PCSM/0.1 BGDMA | |
| IS-7 | 59.9EA/40GMAA/0.1GDMA | 53.32EA/40GMAA/6.67PCSM/0.1GDMA | |
| IS-8 | 59.9EA/40GMAA/0.1DEGDMA | 53.32EA/40GMAA/6.67PCSM/0.1DEGDMA | |
| IS-9 | 59.9EA/40GMAA/0.1 1,4-BDDMA | 53.32EA/40GMAA/6.67PCSM/0.1 1,4-BDDMA | |
| IS-10 | 60EA/40GMAA | 39.7EA/40GMAA/20PCSM/0.3BGDMA | 90/10 |
| IS-11 | 60EA/40GMAA | 54.92EA/40GMAA/5PCSM/0.08BGDMA | 60/40 |
| CS-1 | 60EA/40GMAA | 53.32EA/40GMAA/6.67PCSM/0.1ALMA | 70/30 |

TABLE 1-continued

Thickener Composition

Composition and two-stage emulsion polymerization

| Thickener | M1 (First stage), % by weight based on the weight of total monomers in M1 | M2 (Second stage), % by weight based on the weight of total monomers in M2 | Weight ratio M1/M2 |
|---|---|---|---|
| CS-2 | 57.14EA/40GMAA/2.86PCSM | 59.9EA/40GMAA/0.1ALMA | |
| CS-3 | 58EA/40GMAA/2PCSM | 57.9EA/40GMAA/2PCSM/0.1ALMA | |
| CS-4 | 60EA/40GMAA | 53.33EA/40GMAA/6.67PCSM | |
| CS-5 | 60EA/40GMAA | 53.33EA/40GMAA/6.67PCSM/0.1EGDMA | |
| CS-6 | 52EA/48GMAA | 45.23EA/48GMAA/6.67BEM/0.1ALMA | |
| CS-7 | 60EA/40GMAA | 53.23EA/40GMAA/6.67NH1565/0.1DAP | |
| CS-8 | 46.915EA/48GMAA/5PCSM//0.085 nDDM | | one stage |
| CS-9 | 60EA/40GMAA | 55.94EA/40GMAA/4PCSM/0.06BGDMA | 50/50 |
| CS-10 | 60EA/40GMAA | 57.1EA/40GMAA/2.86PCSM/0.04BGDMA | 30/70 |

TABLE 2

Properties of Thickeners

| Thickener No. | pH | Solids, % by weight | Viscosity* (2#/60 rpm) | Particle size (nm) |
|---|---|---|---|---|
| IS-1 | 4.47 | 30.56 | 7.2 | 77 |
| IS-2 | 4.25 | 32.98 | 5.6 | 153 |
| IS-3 | 4.27 | 31.52 | 6.3 | 126 |
| IS-4 | 3.92 | 30.67 | 8.5 | 104 |
| IS-5 | 4.19 | 31.5 | 9 | 108 |
| IS-6 | 4.29 | 32.42 | 9.5 | 110 |
| IS-7 | 4.08 | 31.25 | 8.5 | 98 |
| IS-8 | 4.14 | 31.04 | 8 | 101 |
| IS-9 | 3.96 | 30.93 | 9.5 | 93 |
| IS-10 | 2.83 | 30.1 | 7.5 | 142 |
| IS-11 | 2.92 | 30.17 | 8 | 130 |
| CS-1 | 3.72 | 31.58 | 8.1 | 104 |
| CS-2 | 3.83 | 30.23 | 7.8 | 100 |
| CS-3 | 3.5 | 30.12 | 8.2 | 100 |
| CS-4 | 3.21 | 31.82 | 8.5 | 115 |
| CS-5 | 3.07 | 34.49 | 8.2 | 104 |
| CS-6 | 2.86 | 33.92 | 6.5 | 158 |
| CS-7 | 2.99 | 34.39 | 7.3 | 121 |
| CS-8 | 3.50 | 35% | 7.5 | 130 |
| CS-9 | 3.41 | 30.4 | 8 | 106 |
| CS-10 | 3.57 | 30.59 | 7 | 120 |

*Viscosity was measured by a Brookfield viscometer at a shear rate of 60 rpm with spindle #2 at room temperature.

Paint Formulation IP-1

The paint formulation of IP-1 was prepared by a two-step coating preparation technique.

Grind Phase: water (150 g), AMP-95 (1.05 g), propylene glycol (20 g), OROTAN 1288 (7.88 g), Kathon LXE (1.05 g), TRITON CF-10 wetting agent (2.12 g), Foamaster NXZ defoamer (1.05 g), Ti-Pure R-902 $TiO_2$ (90.31 g), CC-700 extender (305.29 g), and DB-80 extender (77.19 g) were added into a tank sequentially and stirred with a high speed COWLES mixer. The grind phase components were then well dispersed.

Letdown Phase: After the grind phase, the COWLES mixer was replaced with a low-shear conventional lab mixer. PRIMAL AS-356 (107 g), Texanol coalescent (4.82 g), ROPAQUE Ultra E opaque polymer (30 g), Foamaster NXZ defoamer (0.5 g), AMP-95 (0.6 g), and DI water (151.14 g) were then added to the tank and stirred at low speed dispersion. Finally, HASE IS-1 (11.41 g) and DI water (38.59 g) were added to obtain the paint formulation with KU about 100.

Paint Formulation IP-2 to IP-11 and CP-1 to CP-9

Inventive paint formulations of IP-2 to IP-11 and comparative paint formulations of CP-1 to CP-9 were made according to the same procedure as described above in preparing the paint formulation of IP-1, except that the type and dosage of thickeners (i.e., thickening efficiency) were different and shown in Table 3. The amount of water used for each paint formulation was adjusted to make up a total weight of the paint formulation of 1,000 g. The obtained paint formulations were evaluated according to the test methods described above and results are given in Table 3.

Table 3 gives heat-age stability results of paint formulations as evaluated by delta KU. As shown in Table 3, all inventive paint formulations (IP-1 to IP-11) showed KU change less 10 units after 35 days heat-age at 50° C., while all comparative paints (CP-1 to CP-9) demonstrated the KU change more than 10 units after heat-age at 50° C. for 35 days, or for only 7 days. All inventive HASE samples (IS-1 to IS-11) were made by two-stage emulsion polymerization, wherein the alkali-soluble polymer obtained in the first stage comprised structural units of GMAA and EA but no structural units of the hydrophobic associated monomer, and the polymer obtained in the second stage was a specific cross-linked hydrophobic alkali-soluble polymer comprising structural units of the hydrophobic associated monomer.

When the hydrophobic associated monomer was added in the first stage, the obtained thickeners (CS-2 and CS-3) provided paint formulations with poor heat-age stability as indicated by KU changes more than 20 after storage at 50° C. 35 days. When allyl-group-containing crosslinking agents (e.g., ALMA and DAP) were used in preparing comparative thickeners of CS-1, CS-3, CS-6 and CS-7, paint formulations comprising such thickeners showed unstable heat-age stability (KU change more than 10 units after heat aging at 50° C. after 7 days or longer). When no crosslinking agent or EGDMA crosslinker was used in the second stage of preparing thickeners (CS-4 and CS-5), the paint formulations comprising such thickeners had poor heat-age stability. The thickeners of CS-9 and CS-10 with weight ratios of the first stage polymer to the second stage polymer of 50/50 and 30/70, respectively, provided paint formulations with poor heat-age stability, as indicated by the KU change more than 10 units.

TABLE 3

Heat-age stability of paint formulations

| Paint No. | Thickener No. | Thickening Efficiency (g), by dry weight | ΔKU after heat aging | | | | |
|---|---|---|---|---|---|---|---|
| | | | 7 days at 50° C. | 14 days at 50° C. | 21 days at 50° C. | 28 days at 50° C. | 35 days at 50° C. |
| IP-1 | IS-1 | 3.49 | 1.6 | −0.8 | 0.9 | 0.8 | 1.3 |
| IP-2 | IS-2 | 2.97 | 3.9 | 2.3 | 1.2 | 1.1 | −0.1 |
| IP-3 | IS-3 | 3.92 | 0.2 | 0.9 | 1 | 1 | 0.6 |
| IP-4 | IS-4 | 4.05 | 2.3 | 3.5 | 1.1 | 2 | 0.8 |
| IP-5 | IS-5 | 2.99 | 5.8 | 4 | 4.4 | 5.6 | 6.8 |
| IP-6 | IS-6 | 3.14 | 8.1 | 8.5 | 9.3 | 9.1 | 9.4 |
| IP-7 | IS-7 | 3.18 | 9 | 9.6 | 9 | 8.9 | 7.7 |
| IP-8 | IS-8 | 3.1 | 7.4 | 6.9 | 7.7 | 7.4 | 6.8 |
| IP-9 | IS-9 | 3.16 | 4.3 | 4.6 | 4.2 | 3.8 | 5.4 |
| IP-10 | IS-10 | 6.39 | 4.9 | −1.9 | −9.3 | −5 | −9.7 |
| IP-11 | IS-11 | 2.97 | 7.2 | 7.9 | 9.6 | 9.5 | 9.8 |
| CP-1 | CS-1 | 3.5 | 15.4 | 17.9 | 17.8 | 20.4 | 22.2 |
| CP-2 | CS-2 | 3.41 | 20.6 | 21.6 | 26.6 | 27.7 | 29.1 |
| CP-3 | CS-3 | 2.98 | 20.1 | 24.9 | 28.7 | 29.6 | 33.8 |
| CP-4 | CS-4 | 3.01 | 9.6 | 10.6 | 10.7 | 11.4 | 12.5 |
| CP-5 | CS-5 | 3.28 | 8.7 | 7.8 | 11.1 | 10.7 | 10.5 |
| CP-6 | CS-6 | 4.15 | 8.3 | 13 | 10 | 12.1 | 13.2 |
| CP-7 | CS-7 | 3.21 | 12 | 10.5 | 11.5 | 10 | 12.1 |
| CP-8 | CS-9 | 2.91 | 10.6 | 12.5 | 14.1 | 13.1 | 20.8 |
| CP-9 | CS-10 | 2.64 | 14.9 | 20.1 | 25.3 | 24.1 | 30.8 |

Paint Formulation IP-12

The paint formulation of IP-12 was prepared by a two-step coating preparation technique:

Grind Phase: water (200 g), AMP-95 (1 g), CELLOSIZE QP 30000H (1 g), OROTAN 1288 (3.5 g), BD-109 wetting agent (1.2 g), SR-237 (30 g), Foamaster NXZ defoamer (1 g), ASP-170 (60 g), CC-700 extender (300 g), and DB-80 extender (110 g) were added into a tank sequentially and stirred with a high speed COWLES mixer (about 2,000-2,500 rpm). The grind phase components were then well dispersed.

Letdown Phase: After the grind phase, the COWLES mixer was replaced with a low-shear conventional lab mixer (<1000 rpm). BATF 998A (110 g), Texanol coalescent (5 g), Kathon LXE (1 g), Foamaster NXZ defoamer (1 g), and DI water (125.3 g) were then added to the tank and stirred at low speed dispersion. Finally, the HASE IS-1 thickener (14.14 g by wet weight) prepared above, AMP-95 (1 g) and DI water (34.86 g) were added to make the paint formulation with a viscosity of about 100 KU.

Comp Paint Formulation CP-10

The paint formulation of CP-10 was made according to the same procedure as preparing the paint formulation of IP-12, except that 2.34 g by dry weight of CS-8 thickener was used as shown in Table 4. The amount of water for each paint formulation was adjusted to make up a total weight of the paint formulation of 1000 g.

The obtained paint formulations were evaluated for heat-age stability properties according to the test method described above and results are given in Table 4. As shown in Table 4, the paint formulation of IP-12 comprising the IS-1 thickener of the present invention was stable after over 28-day storage at 50° C. In contrast, the comparative paint formulation of CP-10 comprising the one-stage linear HASE thickener (CS-8) showed obvious instability after heat aging at 50° C. for 14 days or longer. The paint formulation of IP-12 also showed less KU change upon addition of colorants as compared to the paint formulation of CP-10.

TABLE 4

Stability after heat aging or upon addition of colorants

| Paint No. | Thickener No. | Thickening Efficiency (g), by dry weight | ΔKU upon addition of colorants | ΔKU after heat aging | | | |
|---|---|---|---|---|---|---|---|
| | | | | 7 days (50° C.) | 14 days (50° C.) | 21 days (50° C.) | 28 days (50° C.) |
| IP-12 | IS-1 | 4.32 | 32.9 | −3.5 | −3.5 | −3.1 | −4.8 |
| CP-10 | CS-8 | 2.34 | 46.5 | 8.2 | 10.4 | 12.2 | 10.4 |

What is claimed is:

1. An aqueous dispersion of a multistage polymer, wherein the multistage polymer comprises:
   (A) in a first stage, a polymer A comprising, by weight based on the weight of the polymer A,
      (a1) 15% or more of structural units of an α, β-ethylenically unsaturated carboxylic acid,
      (a2) structural units of a monoethylenically unsaturated nonionic monomer,
      (a3) less than 0.1% of structural units of a hydrophobic associated monomer, and optionally
      (a4) structural units of a crosslinker selected from a $C_3$-$C_{20}$ alkylene glycol di(meth)acrylate, a poly(alkylene glycol) di(meth)acrylate, and combinations thereof; and
   (B) in a second stage, a polymer B comprising, by weight based on the weight of the polymer B, (b1) 15% or more of structural units of an α, β-ethylenically unsaturated carboxylic acid,
(b2) structural units of a monoethylenically unsaturated nonionic monomer,
(b3) from 0.1% to 60% by weight of structural units of a hydrophobic associated monomer, and
(b4) structural units of a crosslinker selected from a $C_3$-$C_{20}$ alkylene glycol di(meth)acrylate, a poly(alkylene glycol) di(meth)acrylate, and combinations thereof;
wherein the weight ratio of the polymer A to the polymer B is from 95:5 to 55:45.

2. The aqueous dispersion of claim 1, wherein the crosslinkers (a4) and (b4) are each independently selected from 1,3-butylene glycol dimethacrylate, 1,4-butanediol dimethacrylate, glycerol 1,3-dimethacrylate, diethylene glycol dimethacrylate, triethylene glycol dimethacrylate, tripropylene glycol dimethacrylate, 1,6-hexanediol di(meth)acrylate, neopentyl glycol di(meth)acrylate, 1,9-nonanediol di(meth)acrylate, propylene glycol diacrylate, 1,1,1-trimethylolpropane dimethacrylate, 1,1,1-trimethylolethane diacrylate, or mixtures thereof.

3. The aqueous dispersion of claim 1, wherein the multistage polymer has a weight average molecular weight of from 1,000,000 to 9,000,000 daltons.

4. The aqueous dispersion of claim 1, wherein the weight ratio of the polymer A to the polymer B is from 90:10 to 60:40.

5. The aqueous dispersion of claim 1, wherein the hydrophobic associated monomers (a3) and (b3) each independently have the structure of formula I,

$$H_2C=C(R)CO_2(CH_2CH_2O)_n(CH(R^1)CH_2O)_mR^2 \quad (I),$$

wherein R is H or $CH_3$, $R^1$ is a $C_1$-$C_2$ alkyl group, $R^2$ is an aralkyl phenyl group or a $C_8$-$C_{50}$ linear or branched alkyl group, n is an integer of from 6 to 100, and m is an integer of from 0 to 50, provided that n≥m and m+n is from 6 to 100.

6. The aqueous dispersion of claim 1, wherein the polymer A is substantially free of structural units of the hydrophobic associated monomer.

7. The aqueous dispersion of claim 1, wherein the monoethylenically unsaturated nonionic monomers (a2) and (b2) are each independently alkyl esters of (meth)acrylic acids.

8. The aqueous dispersion of claim 1, wherein the polymer A comprises, by weight based on the weight of the polymer A,
(a1) from 20% to 60% of structural units of the □, β-ethylenically unsaturated carboxylic acid,
(a2) from 40% to 80% of structural units of the monoethylenically unsaturated nonionic monomer,
(a3) from 0 to 0.05% of structural units of the hydrophobic associated monomer, and
(a4) from 0 to 0.25% of structural units of the crosslinker.

9. The aqueous dispersion of claim 1, wherein the polymer B comprises, by weight based on the weight of the polymer B, from 0.1% to 30% of structural units of the hydrophobic associated monomer.

10. The aqueous dispersion of claim 1, wherein the multistage polymer comprises:
(A) the polymer A comprising, by weight based on the weight of the polymer A,
(a1) from 20% to 60% of structural units of the α, β-ethylenically unsaturated carboxylic acid, (a2) from 40% to 80% of structural units of the monoethylenically unsaturated nonionic monomer,
(a3) from 0 to 0.02% of structural units of the hydrophobic associated monomer, and
(a4) from 0 to 0.25% of structural units of the crosslinker; and
(B) the polymer B comprising, by weight based on the weight of the polymer B,
(b1) from 20% to 60% of structural units of the α, β-ethylenically unsaturated carboxylic acid,
(b2) from 35% to 75% of structural units of the monoethylenically unsaturated nonionic monomer,
(b3) from 1% to 10% of structural units of the hydrophobic associated monomer, and
(b4) from 0.01% to 2% of structural units of the crosslinker;
wherein the weight ratio of the polymer A to the polymer B is 90:10 to 60:40.

11. A process of preparing an aqueous dispersion of a multistage polymer by multistage free-radical polymerization, comprising:
(i) preparing a polymer A in an aqueous medium by free-radical polymerization of a first monomer mixture comprising, based on the total weight of the first monomer mixture,
15% by weight or more of an α, β-ethylenically unsaturated carboxylic acid, a monoethylenically unsaturated nonionic monomer, less than 0.1% by weight of a hydrophobic associated monomer, and optionally a crosslinker selected from a $C_3$-$C_{20}$ alkylene glycol di(meth)acrylate, a poly(alkylene glycol) di(meth)acrylate, or combinations thereof; and
(ii) preparing a polymer B in the presence of the polymer A obtained from step (i) by a free-radical polymerization of a second monomer mixture comprising, based on the total weight of the second monomer mixture,
15% by weight or more of an α, β-ethylenically unsaturated carboxylic acid, a monoethylenically unsaturated nonionic monomer, from 0.1% to 60% by weight of a hydrophobic associated monomer, and a crosslinker selected from a $C_3$-$C_{20}$ alkylene glycol di(meth)acrylate, a poly(alkylene glycol) di(meth)acrylate, or combinations thereof;
wherein the weight ratio of the polymer A to the polymer B is from 95:5 to 55:45.

12. An aqueous coating composition comprising an aqueous dispersion of claim 1.

* * * * *